United States Patent [19]

Rigaux et al.

[11] Patent Number: 5,382,098
[45] Date of Patent: Jan. 17, 1995

[54] SEALING DEVICE INCLUDING AN ENCODING ELEMENT FOR A BEARING, AND BEARING EQUIPPED WITH SUCH A DEVICE

[75] Inventors: Christian Rigaux, Artannes-sur-Indre; Pascal Lhote, Saint-Cyr-sur-Loire; Claude Caillault, Saint-Roch; Christophe Houdayer, Tours, all of France

[73] Assignee: SKF France, Clamart, France

[21] Appl. No.: 154,075

[22] Filed: Nov. 18, 1993

[30] Foreign Application Priority Data

Nov. 24, 1992 [FR] France .................. 92 14074

[51] Int. Cl.⁶ ................. F16C 33/76; G01P 3/48
[52] U.S. Cl. ................. 384/448; 324/207.25
[58] Field of Search ............. 384/448, 446; 324/207.25, 207.22, 207.21, 174, 173

[56] References Cited

U.S. PATENT DOCUMENTS

| | | | |
|---|---|---|---|
| 4,259,637 | 3/1981 | Bloomfield et al. | 324/207.25 X |
| 4,732,494 | 3/1988 | Guers et al. | 384/448 |
| 4,850,722 | 7/1989 | Bayer | 384/448 |
| 4,946,296 | 8/1990 | Olschewski et al. | 384/448 |
| 4,948,277 | 8/1990 | Alff | 384/448 |
| 5,004,358 | 4/1991 | Varvello et al. | 384/448 |
| 5,011,303 | 4/1991 | Caron | 384/448 |
| 5,195,830 | 3/1993 | Caillault et al. | 384/448 |
| 5,296,805 | 3/1994 | Clark et al. | 384/448 X |

FOREIGN PATENT DOCUMENTS

| | | |
|---|---|---|
| 320322 | 6/1989 | European Pat. Off. . |
| 0397309 | 11/1990 | European Pat. Off. . |
| 0438624 | 7/1991 | European Pat. Off. . |
| 2558223 | 7/1985 | France . |
| 2629155 | 9/1989 | France . |
| 9010131 | 10/1990 | Germany . |

Primary Examiner—Thomas R. Hannon
Attorney, Agent, or Firm—Beveridge, DeGrandi, Weilacher & Young

[57] ABSTRACT

The sealing device (1) for a bearing (2) includes a first piece (8) of annular overall shape secured to the non-rotating race (4) of the bearing and supporting a permanent magnet (14), a second piece (9) of annular overall shape secured to the rotating race (3) of the bearing and including an annular part forming a pulse generator and a flexible sealing part in contact with the first piece. In operation the first and second pieces (8, 9) mounted in the radial space between the rotating race and non-rotating race at one end of the bearing provide the sealing of the bearing with respect to the external surroundings, the permanent magnet (14) being arranged facing a sensor (11) which is fixed with respect to the non-rotating race, the pulse generator passing between the permanent magnet and the sensor during the rotation of the rotating race of the bearing.

20 Claims, 9 Drawing Sheets

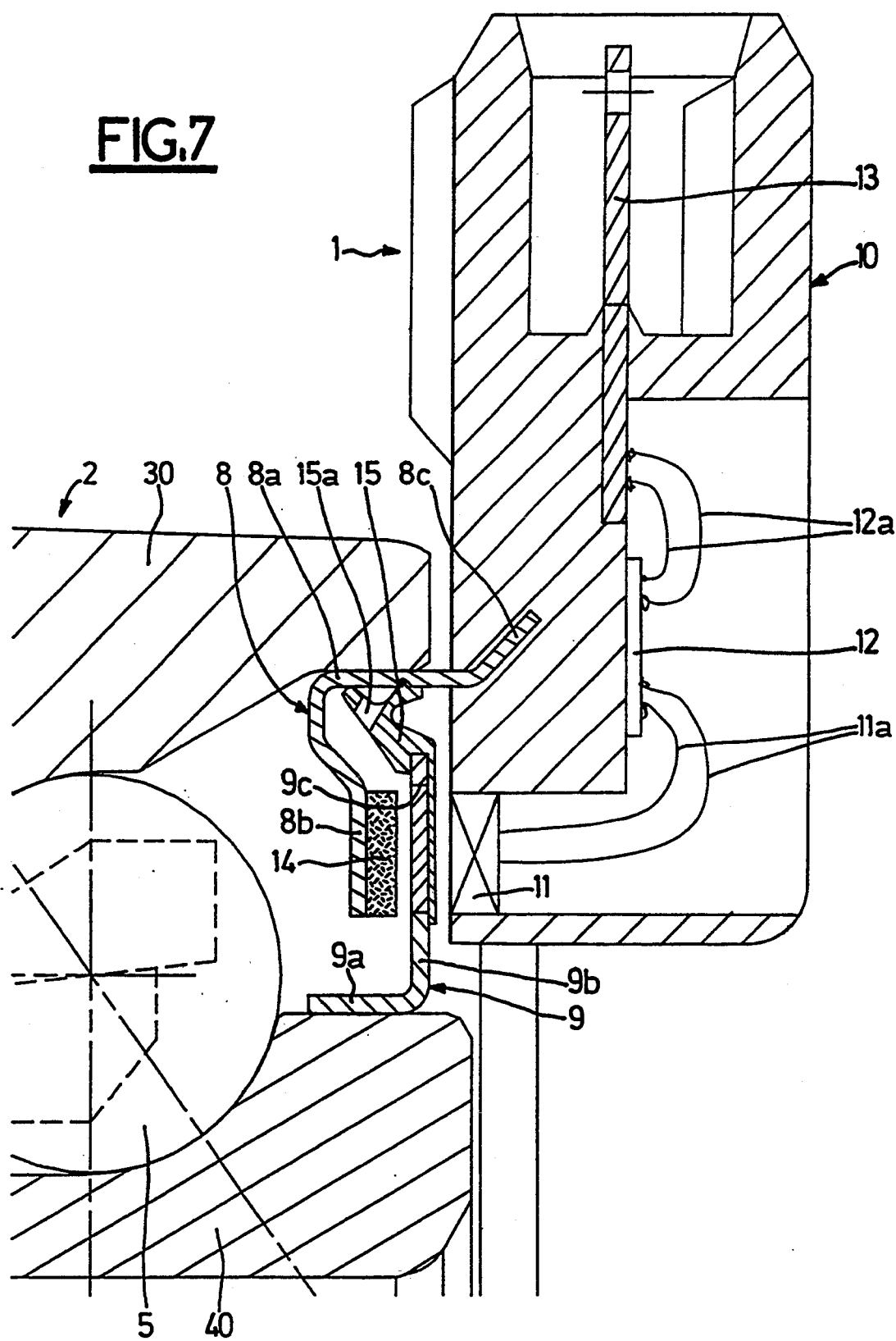

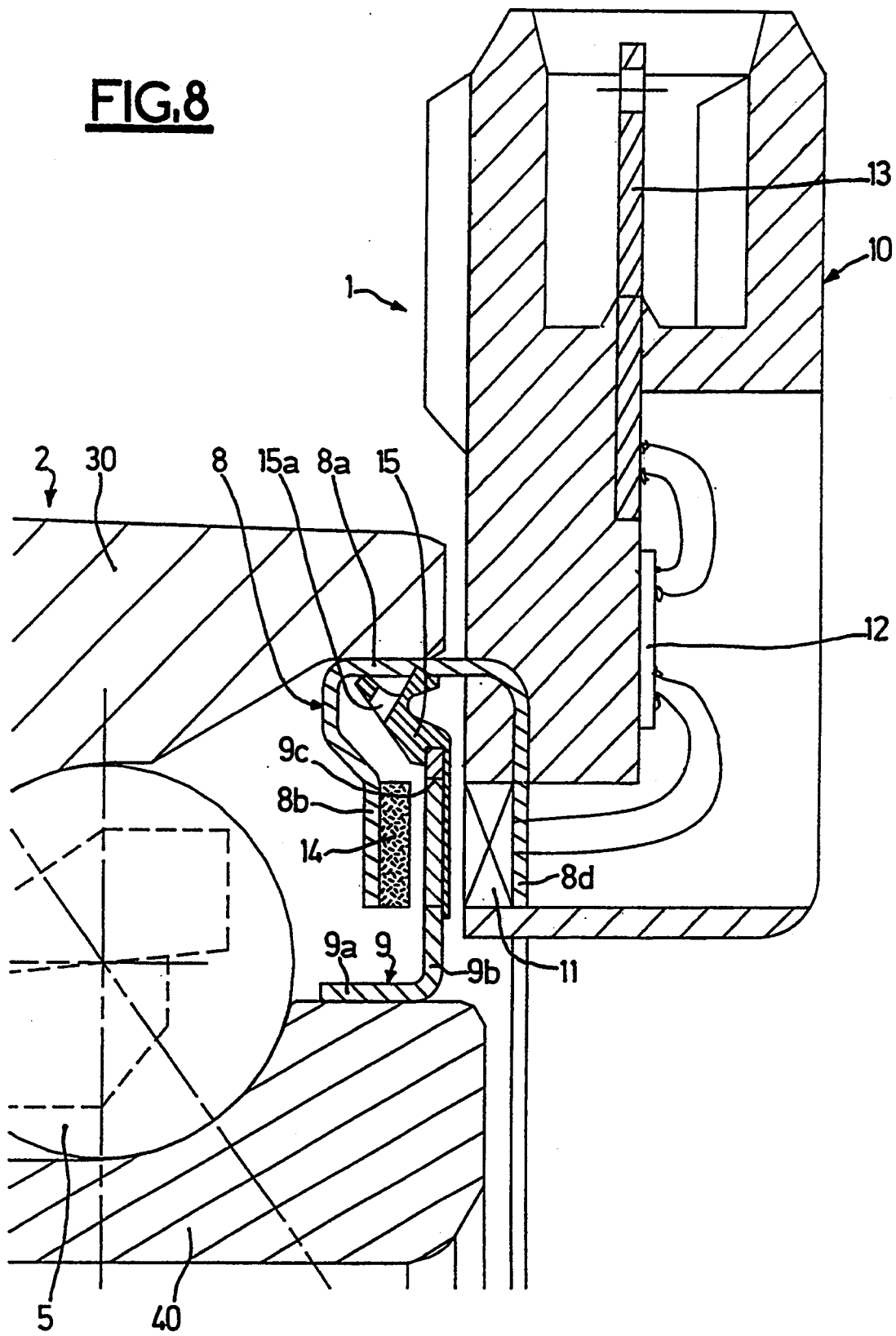

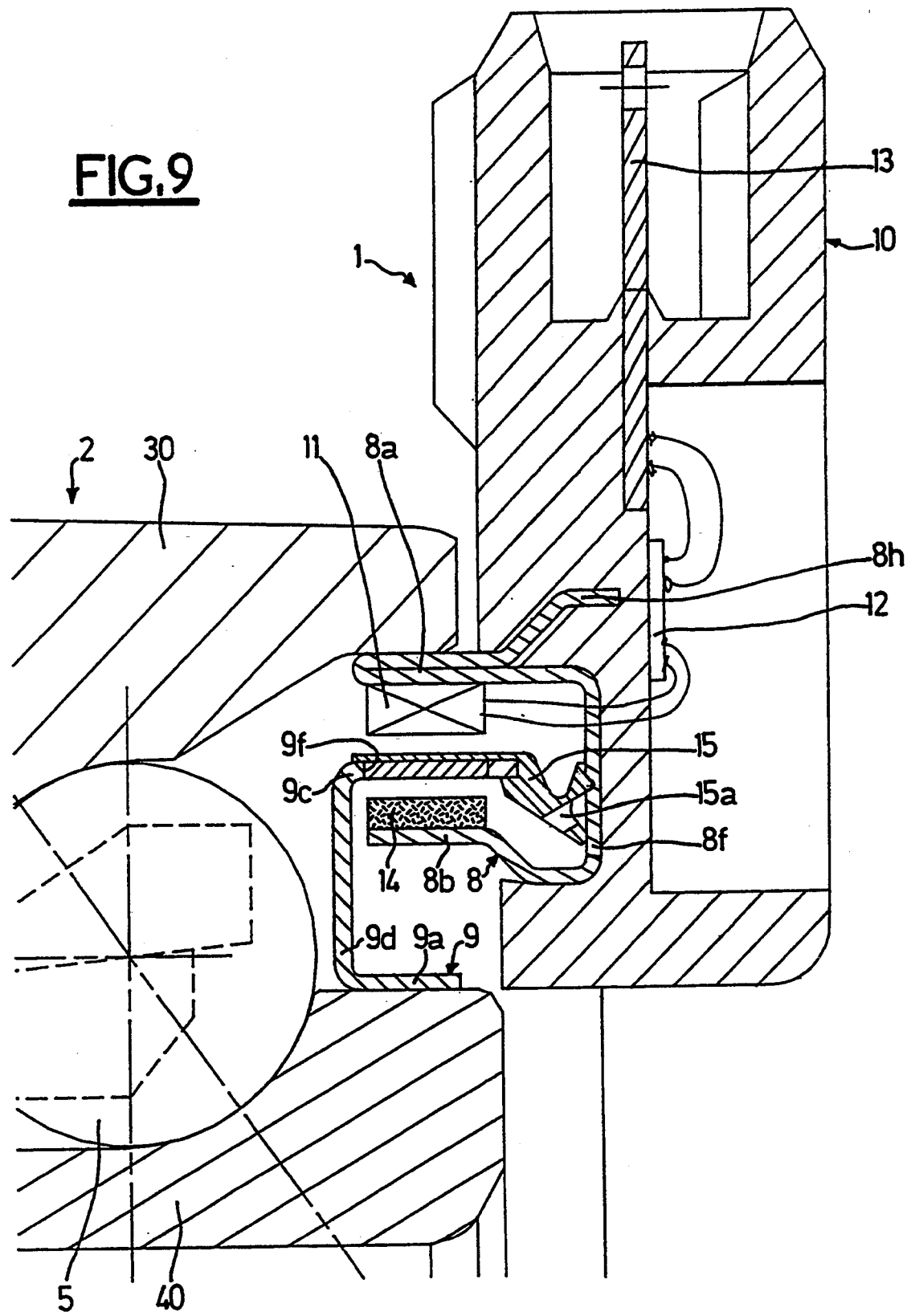

SEALING DEVICE INCLUDING AN ENCODING ELEMENT FOR A BEARING, AND BEARING EQUIPPED WITH SUCH A DEVICE

FIELD OF THE INVENTION

The present invention relates to a sealing device which is used in particular to provide sealing for bearings. The device includes a built-in encoding element intended to determine the characteristics of rotation of the rotating part of the bearing with respect to the non-rotating part of the bearing. The invention also relates to a bearing equipped with such a sealing device.

In a specific application, the sealing device with its integral encoding element is used to equip wheel bearings of a motor vehicle provided with a wheel anti-lock braking system of the "ABS" type.

BACKGROUND DISCUSSION

American patent No. 4,850,722 (FAG) and French patent No. 2,629,155 (SKF GmbH) disclose sealing devices for a bearing into which are built encoding elements intended to generate flux variations in a magnetic field in the vicinity of a passive sensor, creating, in the latter, signals in the form of a variable current which signals make it possible to determine the characteristics of rotation of the rotating part of the bearing, such as speed of rotation, angular acceleration or angular displacement, with respect to the non-rotating part of the bearing.

The major drawback of these conventional devices is that they operate in interaction with a passive sensor of the inductive type generally including a magnet, a polar core and a coil and the use of which involves a relatively large size, a high sensitivity to the variations in air gap between the sensor and the target creating the flux variations in the magnetic field. In addition, with this sort of device, the amplitude of the signal supplied by the sensor is too low to be used at low speeds of rotation close to zero, which corresponds, for an application to a wheel bearing equipped with an anti-lock braking system of the ABS type, to a vehicle speed of less than approximately 5 km/h.

A known solution for overcoming the aforementioned drawbacks consists in using, as a type of sensor, Hall-effect probes or magnetoresistive sensors. The encoding element interacting with this type of sensor must be capable of generating, in rotation, magnetic field strength variations. To do this, use is made of a multipolar ring secured to the rotating part of the bearing and passing rotationally in front of the sensor.

However, the use of a multipolar ring as encoding element has certain drawbacks in terms of the production of the said ring and of securing it to the rotating part of the bearing. These are, for example, problems of accuracy in manufacturing the multipolar ring, in magnetizing the segments of the multipolar ring, of temperature-related behaviour and differential thermal expansion with respect to the support of the ring.

Furthermore, European patent application EP No. 0,320,322 (SNR) discloses a bearing with a magnetic field detector in which the variations in magnetic field strength may be generated by the combination of a permanent magnet secured to the non-rotating part of the bearing and by an annular element with radial fins which are permeable to the magnetic flux and secured to the rotating part of the bearing. A magnetic field sensor is mounted on the non-rotating part of the bearing axially facing the permanent magnet, the element with fins passing rotationally between the permanent magnet and the sensor.

The detection device according to document EP 0,320,322 has the advantage of providing a signal which is stable because the distance separating the permanent magnet and the sensor is constant without a variation in air gap. However, this detection device is designed for a very specific structure of bearing in which the rotating part consists of a rotary shaft, without any preoccupation as regards sealing the bearing with respect to the external surroundings. The art disclosed in this document furthermore involves a high number of elements to be handled and to be positioned between the rotary shaft and the fixed support which surrounds it. That involves difficulties in assembly, in the accurate positioning of the elements, and in the electrical connection of the sensor (which electrical connection is not discussed in this document).

SUMMARY OF THE INVENTION

The object of the present invention is to propose a sealing device for a bearing into which is built an encoding element for generating variations in magnetic field strength without the drawbacks of the state of the art as discussed hereinabove.

In particular, the subject of the invention is a device which at the same time fulfils the role of sealing and the role of detecting the characteristics of rotation for a bearing.

Furthermore, the subject of the invention is a compact sealing device simple to mount on a bearing.

A further object of the invention is a sealing device with a built-in encoding element making it possible to provide reliable and usable signals to determine, in particular, the low speeds of rotation of the bearing.

According to the invention, the sealing device for a bearing comprises a built-in encoding element intended to generate variations in magnetic field strength during a rotation of the bearing, the bearing including a rotating race, a non-rotating race coaxial with the rotating race and rolling elements arranged between the rotating and non-rotating races. The sealing device comprises two pieces of annular overall shape capable of rotating with respect to one another. The first piece is intended to be secured to the non-rotating race of the bearing and supports a permanent magnet. The second piece is intended to be secured to the rotating part of the bearing. It includes an annular part forming a pulse generator intended to create variations in magnetic field strength. The second piece also includes a flexible sealing part in frictional contact with the first piece. In operation, the first and second pieces which are mounted in the radial space between the rotating and non-rotating races at one end of the bearing provide the sealing of the bearing with respect to the external surroundings. The permanent magnet is arranged facing a sensor which is fixed with respect to the non-rotating race. The pulse generator which, together with the permanent magnet forms the said encoding element of the sealing device passes between the permanent magnet and the sensor during a rotation of the rotating race of the bearing.

The first and second pieces may be produced in the form of flanges so as to be fitted axially into the bearing. The second piece preferably has a plurality of openings or notches evenly distributed over the circumference. The flexible seal is advantageously overmoulded onto the second piece with the aid of a plastic or a rubber which also blocks off the openings or notches in the second piece.

Given that the sealing device of the invention is intended to be mounted on one end of the bearing, the sensor may be connected to a central signal-management unit through the use of a connection head extending radially at the said end of the bearing. The connection head may advantageously be produced from plastic which coats a part of the first piece projecting axially with respect to the said end of the bearing.

During operation of the device, the permanent magnet and the sensor are mounted facing one another and are secured to the non-rotating part of the bearing. The pulse generator, forming part of the second piece secured to the rotating part of the bearing is produced from a ferromagnetic material and passes rotationally between the permanent magnet and the sensor. The sensor of magnetic fields which may be of the Hall-effect probe the or a magnetoresistive sensor, picks up the magnetic flux which reaches to it coming from the permanent magnet. When the pulse generator passes in front of the permanent magnet, depending on whether the latter is located facing an opening or a bar separating two consecutive openings of the pulse generator, the magnetic flux reaches the sensor or is deflected into the said bar of the pulse generator. That, in an alternating fashion when the pulse generator is rotating, thus creates variations in magnetic field strength at the sensor which will be converted into an electrical square-wave output signal the frequency of which will be proportional to the speed of rotation of the rotating part of the bearing.

The permanent magnet will preferably be produced based on rare earths in order to provide good temperature-related behaviour. According to the invention, the distance between the permanent magnet and the sensor is constant. There is no variation in the air gap between the permanent magnet and the sensor, the consequence of which is a stable and reliable detection signal in the entire speed of rotation range of the bearing.

BRIEF DESCRIPTION OF THE DRAWINGS

The invention will be better understood upon studying the detailed description of a few embodiments taken by way of non-limiting example and illustrated by the appended drawings in which:

FIG. 7 is a detailed view of the sealing device according to a fifth embodiment of the invention, FIG. 8 is a detailed view of the sealing device according to a sixth embodiment of the invention and FIG. 9 is a detailed view of the sealing device according to a seventh embodiment of the invention.

DETAILED DESCRIPTION OF THE DRAWINGS

Figure 1:
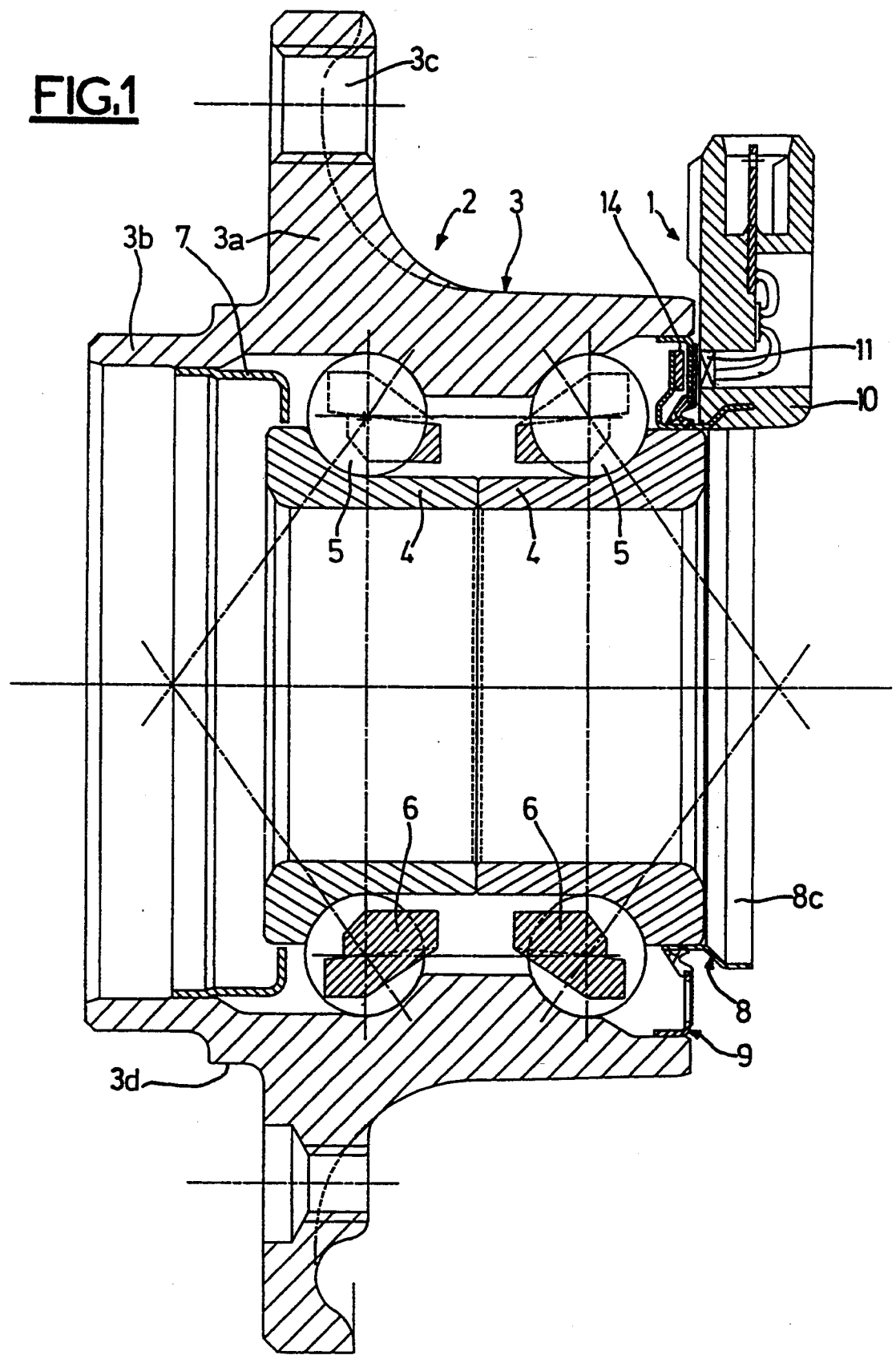
FIG. 1 is an axial section of a bearing for a motor vehicle wheel equipped with a sealing device according to a first embodiment of the invention.
Figure 2:
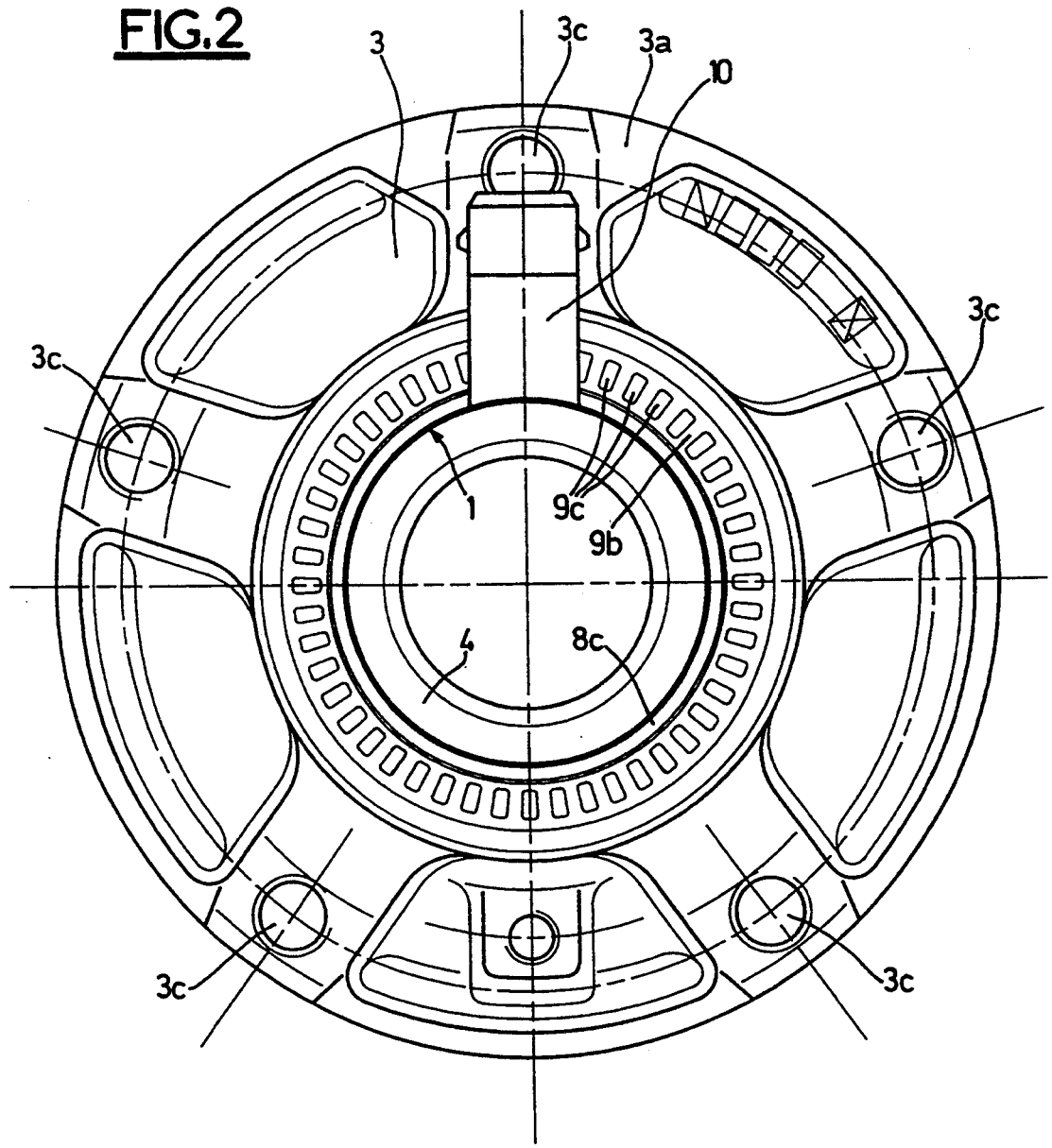
FIG. 2 is a view in the axial direction of the bearing equipped with the sealing device of FIG. 1, in the absence of the overmoulding of the openings of the pulse generator, to simplify the representation.

As illustrated in FIGS. 1 and 2, the sealing device 1 of the invention is mounted on one end of a bearing 2 for a motor vehicle wheel, not represented. The bearing 2 comprises a rotating external race 3, two non-rotating internal half-races 4 and two rows of bearing balls 5 arranged between the external race 3 and internal race 4 and spaced circumferentially by cages 6. The internal half-races 4 are mounted axially side by side about a non-rotating shaft, or stub axle (not represented). The rotating external race 3 has a radial collar 3a extended axially by cylindrical bearing surfaces 3b, 3d serving to centre the wheel and the brake disk (not represented) on the external race 3. Threaded elements (not represented) secure the wheel/disk/external race 3 by interaction with the tapped holes 3c of the radial collar 3a.

The wheel side end of the bearing 2 is sealed with respect to the external surroundings by an annular flange 7 fitted onto an internal cylindrical surface of the cylindrical bearing surface 3b of the external race 3. The other end of the bearing 2 is equipped with the sealing device 1 of the invention.

Figure 3:
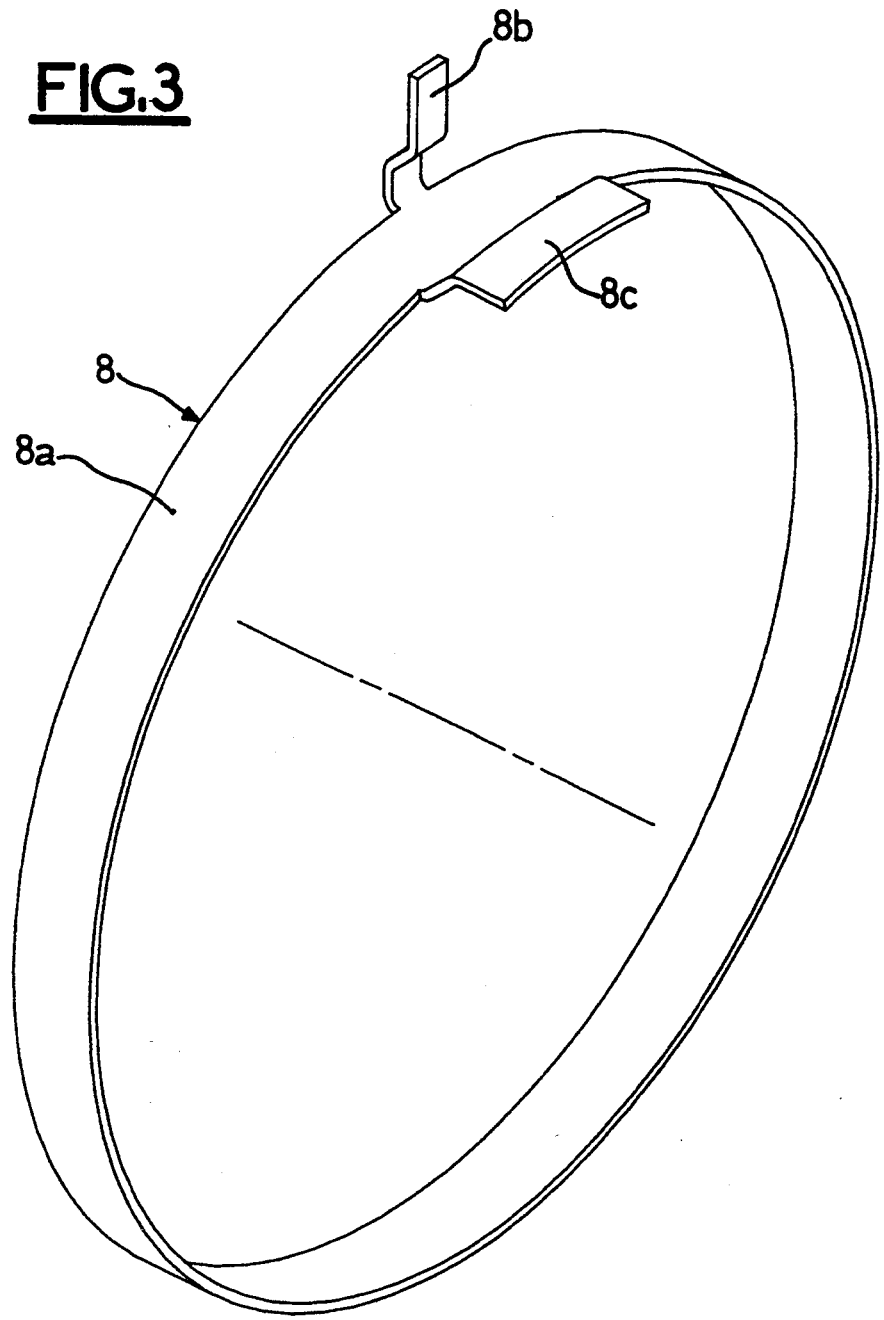
FIG. 3 is a perspective view of the piece supporting both the permanent magnet and the sensor of the sealing device of FIG. 1.

The sealing device will now be described with more particular reference to FIGS. 1, 2, 3 and 4. The sealing device 1 comprises a first piece 8 of annular overall shape mounted securely on the non-rotating internal race 4, and a second piece 9 of annular overall shape is mounted securely to the rotating external race 3 of the bearing. As shown in FIG. 3, the first piece 8 of the sealing device comprises a cylindrical axial part 8a serving as a bearing surface for mounting, by fitting the piece 8 over the non-rotating race 4 of the bearing 2, a permanent magnet support which may be in the form of a simple tab 8b or in the form of a circumferentially continuous collar for greater rigidity (which is not shown). The piece 8 may also include a sensor support in the form of a simple tab 8c projecting axially and/or radially from the cylindrical axial part 8a from which it directly stems. The sensor support 8c advantageously serves as a fastening zone for a connection head 10 which houses a sensor 11 and its built-in electronic circuit for amplifying and shaping the signal, an electronic circuit 12 for protection against interference, and a metallic electrical connector 13 (see FIG. 4). For greater rigidity, the sensor support or the fastening zone 8c may be of continuous annular shape which axially extends the cylindrical axial part 8a of the first piece 8 (see FIGS. 1, 2 and 4). In this case, the connection head 10 is located at a point on this continuous annular part 8c.

Figure 4:
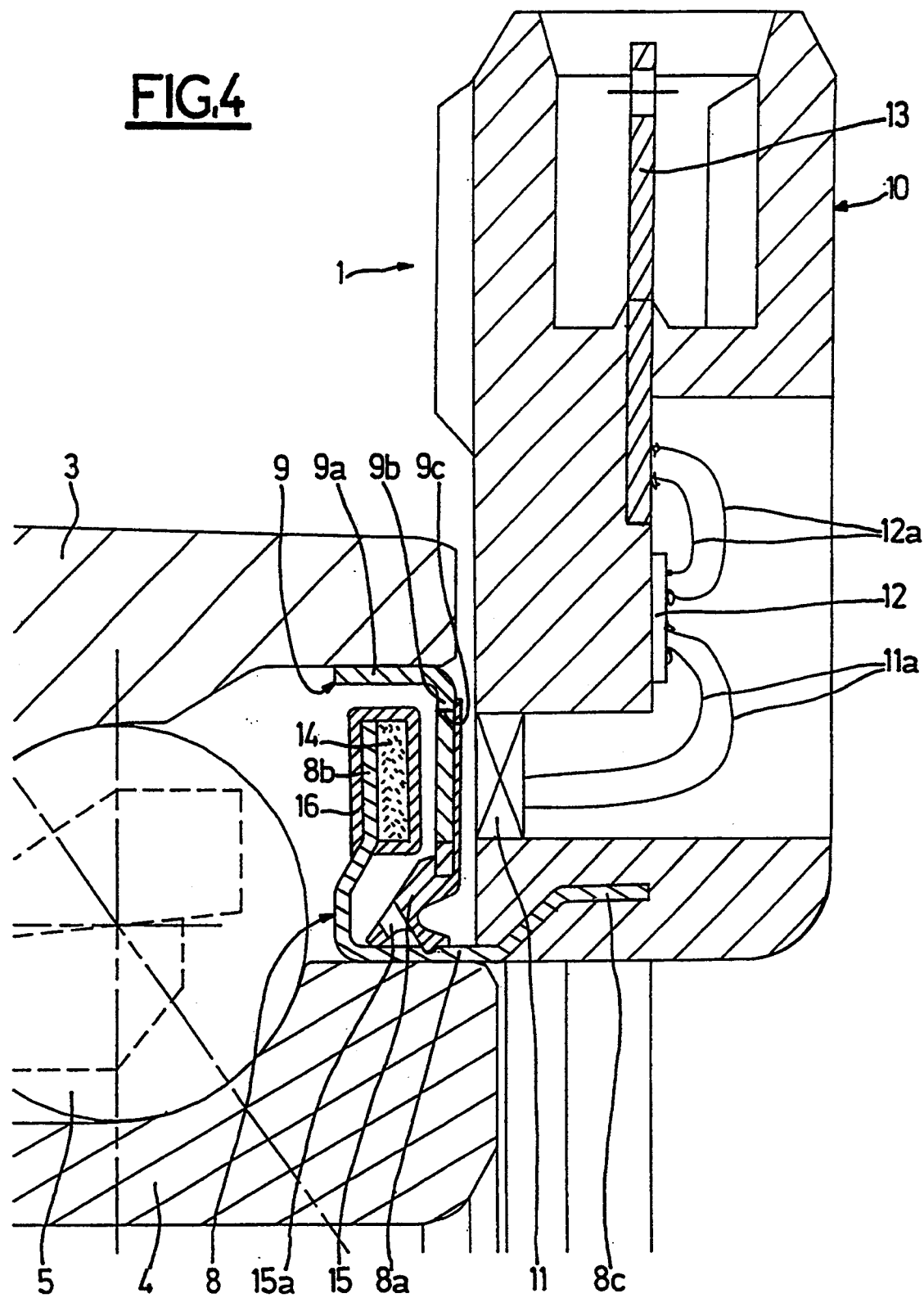
FIG. 4 is a detailed view of the sealing device according to a second embodiment of the invention.

As shown in more detail in FIG. 4, the first piece 8 is in the form of a metallic flange which may be produced from ferromagnetic steel sheet. The cylindrical axial part 8a is fitted axially onto a cylindrical bearing surface of the non-rotating internal race 4. The magnet support tab 8b extends radially and receives a permanent magnet 14 on a radial face orientated opposite the bearing balls 5. The permanent magnet 14 may be produced in substantially parallelepipedal form and fixed to the magnet support 8b by any suitable known means such as bonding, clipping, overmoulding, etc. Overmoulded from plastic on the sensor support 8c of the first piece 8 is the connection head 10 which extends radially outwards. The sensor 11, orientated axially facing the permanent magnet 14 the magnetization of which is axial is fixed into the connection head 10. The sensor 11 arranged axially opposite the permanent magnet 14 is electrically connected to the electronic circuit 12 via the connections 11a. The output from the electronic circuit 12 is electronically connected to the connector 13 via the connections 12a. The electrical connector 13 removably provides the electrical connection between the sealing device 1 and a central signal-processing unit, not represented.

The second piece 9 of the sealing device 1 has a cylindrical axial part 9a acting as a bearing surface for mounting the piece 9 on the rotating external race 3 of the bearing by axial fitting, and a radial part 9b in the form of a substantially plane washer including a plurality of openings 9c or notches evenly distributed on its circumference. The radial part 9b forms the pulse generator which creates the variations in magnetic field strength, the second piece 9 being produced in the form of a flange made from ferromagnetic material. The pulse generator 9b extends radially and passes in the axial space between the sensor 11 and the permanent magnet 14.

The free end of the radial pulse-generator 9b includes an elastomer overmoulding which forms a seal 15 pressing on the cylindrical axial part 8a of the first piece 8 of the sealing device. The seal 15 has two annular sealing lips which are axially offset from one another and inclined with respect to a radial plane. Preferably, one of the sealing lips is provided with at least one perforation 15a intended to balance the pressures. In order to provide sealing, preferably the openings 9c or notches of the radial pulse-generator 9b are closed off by overmoulding from the same elastomer using the same operation as the one used to produce the seal 15.

By virtue of the invention, it is therefore possible to produce the sealing device 1 in the form of a cartridge of annular overall shape which can be fitted onto the bearing in the space between the external and internal races simply by a pressing operation in the axial direction. This results in a great ease of mounting the sealing and detection device on the bearing.

The two embodiments illustrated respectively in FIGS. 1 and 4 are practically identical with the exception of the fixing of the permanent magnet 14 onto the magnet support 8b. According to FIG. 4, the magnet 14 is fixed onto the magnet support 8b by simply overmoulding a layer 16 of plastic coating the permanent magnet 14.

The other embodiments of the sealing device 1 illustrated in FIGS. 5 to 9 stem from the same general inventive concept as the methods described previously. Subsequently, only the differences with respect to the methods already described are mentioned, identical or equivalent elements bear the same references as the methods previously described.

Figure 5:
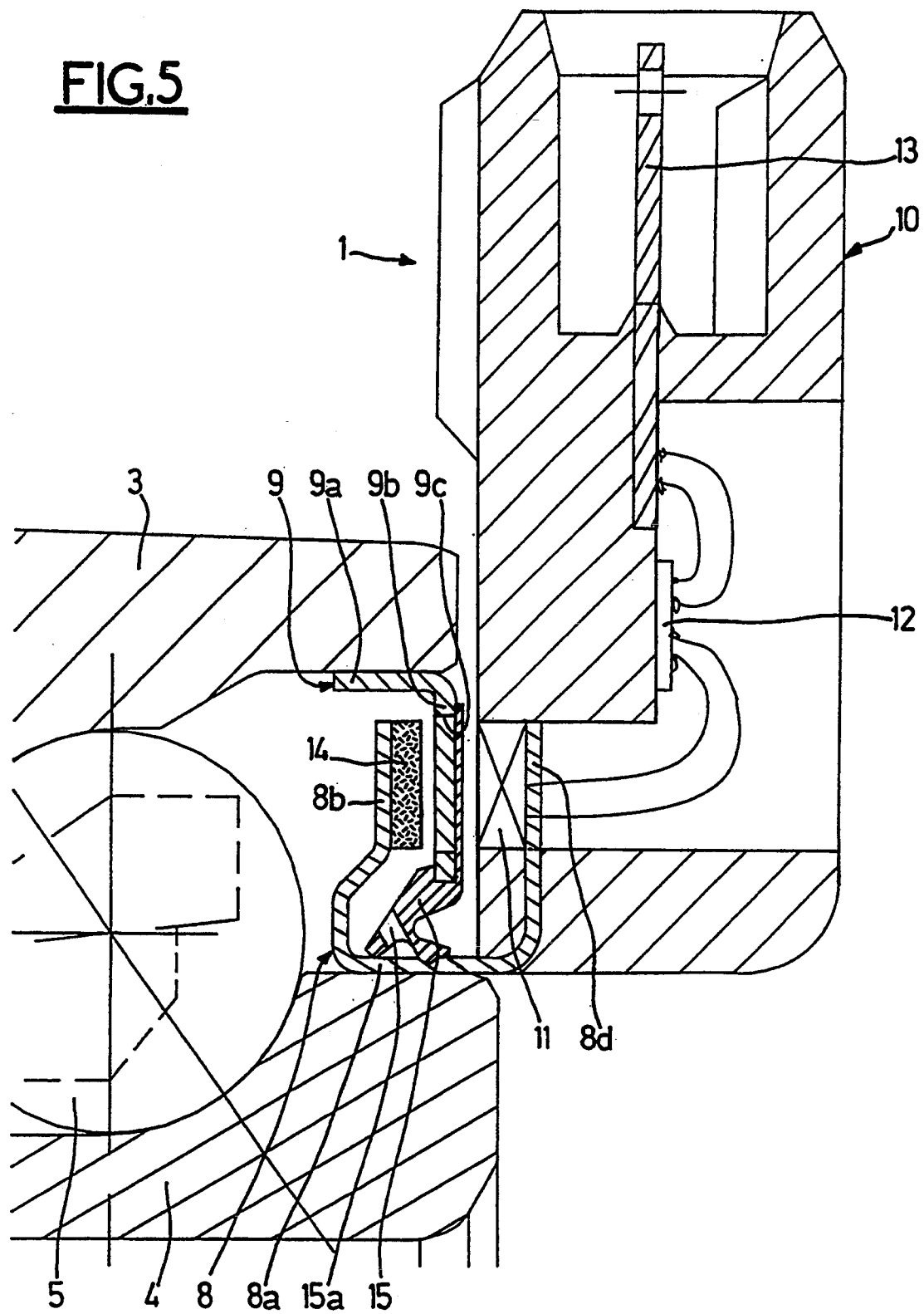
FIG. 5 is a detailed view of the sealing device according to a third embodiment.

The embodiment illustrated in FIG. 5 is practically identical to the one illustrated in FIGS. 1 and 2 except for the sensor support 8c of the first piece 8 of the sealing device 1. Here, the sensor support is produced in the form of a radial tab 8d extending behind the sensor 11 opposite the permanent magnet 14. This configuration effectively makes it possible to reinforce the signal picked up by the sensor 11 because the radial tab 8d produced from ferromagnetic material like the rest of the first piece 8 acts as a magnetic flux concentrator and contributes to enclosing the magnetic field lines on the sensor 11 when the sensor is facing an opening 9c in the radial pulse-generator 9b.

Figure 6:
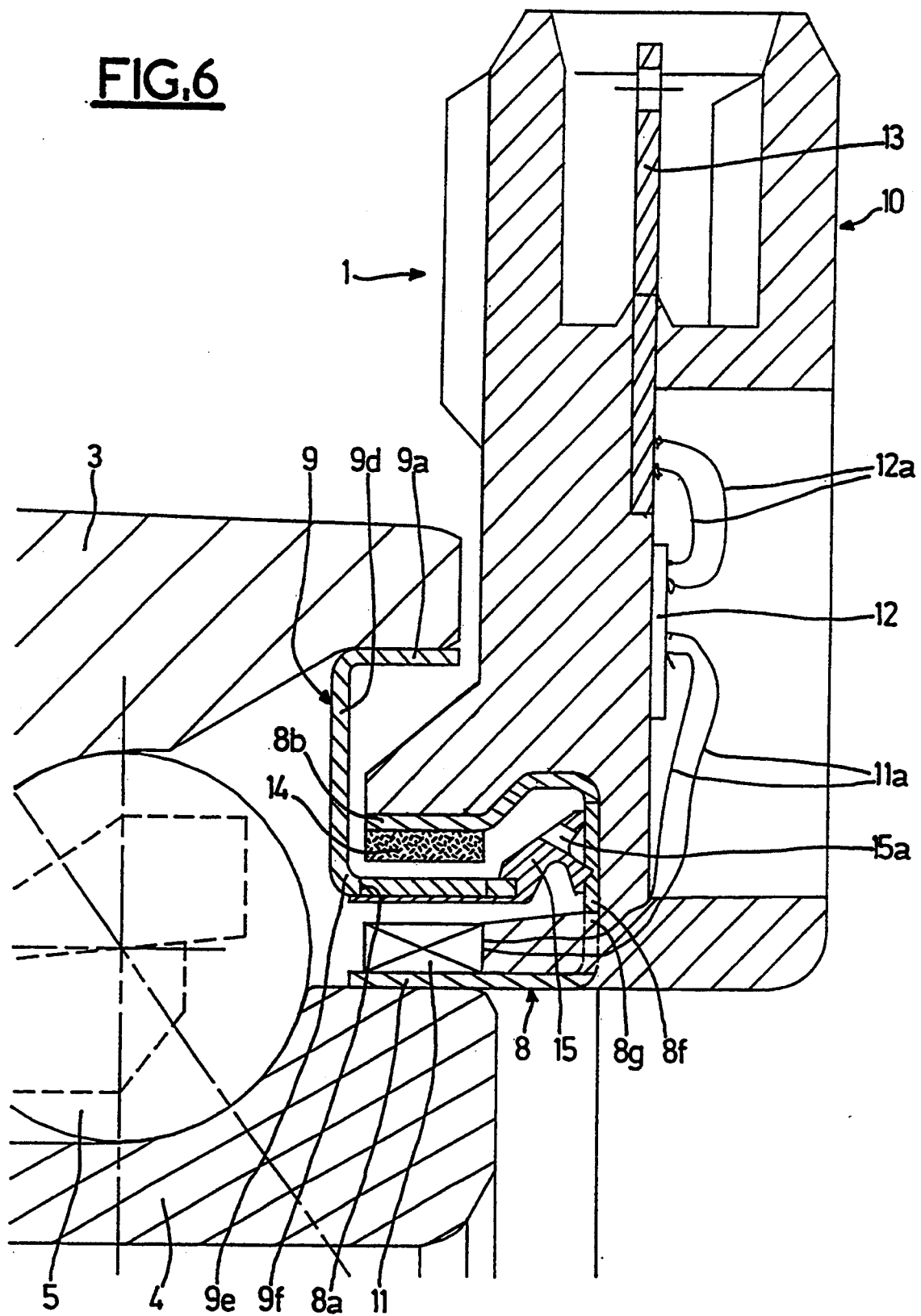
FIG. 6 is a detailed view of the sealing device according to a fourth embodiment of the invention.

FIG. 6 illustrates another embodiment of the sealing device 1 with the sensor 11 and the permanent magnet 14 orientated radially facing one another. The forms of the first and second pieces 8 and 9 are consequently modified. The first piece 8 includes a cylindrical axial part 8a fitted over the non-rotating internal race 4, a radial part 8f and next a part of the magnet support 8b extending axially towards the bearing balls 5, so as to have a substantially U-shaped cross-section in a radial plane. The sensor 11 orientated radially outwards and facing the permanent magnet 14 the magnetization of which is radial is mounted on the cylindrical axial part 8a. The plastic connection head 10 is overmoulded onto the first piece 8 also building in the sensor 11. The radial part 8f of the first piece 8 has an opening 8g allowing the electrical connections 11a between the sensor 11 and the electronic circuit 12 to pass.

The second piece 9 of the sealing device 1 includes a cylindrical axial part 9a mounted by axial fitting into the rotating external race 3, the cylindrical axial part 9a being extended on the bearing balls 5 side by an annular radial part 9d which is then extended by a cylindrical axial part 9e provided with a plurality of openings or notches 9f distributed circumferentially in an even fashion. The cylindrical axial part 9e of the second piece 9 can pass through the radial space formed between the sensor 11 and the permanent magnet 14, so as to generate magnetic field variations. The elastomer seal 15 overmoulded onto the cylindrical axial part 9e presses onto the annular radial part 8f of the first piece 8.

The sealing devices illustrated in FIGS. 1 to 6 are designed for bearings in which the external race is the rotating race. The sealing device according to the invention may also be designed to equip a bearing with the fixed external race, as illustrated in FIGS. 7 to 9.

According to FIG. 7, the external race 30 of the bearing 2 is the non-rotating race whereas the internal race 40 of the bearing is the rotating race. It is therefore sufficient to adapt the embodiment of FIG. 1 by reversing the location of the first and second pieces 8 and 9 to obtain the embodiment illustrated in FIG. 7. The first piece 8 of the sealing device 1 is axially fitted into the non-rotating external race 30, whereas the second piece 9 of the device is fitted onto the rotating internal race 40 of the bearing.

In the same manner, the embodiment illustrated in FIG. 8 is symmetrical with respect to the embodiment illustrated in FIG. 5 by permutating the locations of the first and second pieces 8 and 9 of the device. The first piece 8 of the device is now fitted into the non-rotating external race of the bearing 2 and the second piece 9 is fitted axially onto the rotating internal race 40 of the bearing.

The embodiment as illustrated in FIG. 9 is entirely comparable with the one illustrated in FIG. 6. In this embodiment, the cylindrical axial part 8a of the first piece 8 consists of a double thickness fold extended by a substantially axial fastening zone 8h for the connection head 10. The first piece 8 is fitted axially into the non-rotating external race 30 of the bearing. The second piece 9 of the sealing device 1 is fitted axially onto the rotating internal race 40 of the bearing.

We claim:

1. A sealing device for a bearing which bearing includes a rotating race, a non-rotating race coaxial with the rotating race and rolling elements arranged between the rotating and non-rotating races, said sealing device comprising:

a first piece of annular overall shape which is dimensioned for securement to the non-rotating race of the bearing and which supports a permanent magnet;

a second piece of annular overall shape which is dimensioned for securement to the rotating race of the bearing and which includes an annular part forming a pulse generator and a flexible sealing part in frictional contact with the first piece, the first and second pieces being mounted in a radial space provided between the rotating and non-rotating races to provide a sealing of the bearing with respect to external surroundings, the permanent magnet being arranged facing a sensor which is fixed with respect to the non-rotating race, the pulse generator passing between the permanent magnet and the sensor during a rotation of the bearing to generate variations in magnetic flux detected by the sensor.

2. Sealing device according to claim 1, characterized in that the first and second pieces (8, 9) each include a flange made of ferromagnetic material which axially fits into the bearing, and in that the pulse generator (9b, 9e) of the second piece includes a plurality of openings (9c, 9f) or notches distributed circumferentially in a uniform fashion.

3. Sealing device according to claim 2, characterized in that the flexible sealing part (15) includes an overmoulding component which is obtained by overmoulding an elastomer on the pulse generator, the openings of the pulse generator being blocked off by the overmoulding elastomer.

4. Sealing device according to claim 1 characterized in that the flexible sealing part (15) comprises at least one annular sealing lip coming into frictional contact with a support surface of the first piece (8).

5. Sealing device according to claim 1, characterized in that the first piece (8) comprises a cylindrical axial part (Sa) which serves both as a bearing surface for mounting on the non-rotating race (4; 30) of the bearing and as a sealing bearing surface for the flexible sealing part (15), a magnet support (8b) in the form of a tab or of a collar, and a sensor support (8c, 8f) also acting as a fastening zone for the over-moulding of a plastic connection head (10) housing the sensor (11).

6. Sealing device according to claim 1, characterized in that the first piece (8) has a part (8d, 8a) located behind the sensor (11) opposite the permanent magnet (14) to form a flux concentrator and to contribute to enclosing the magnetic field lines on the sensor when the sensor is facing an opening (9c, 9f) of the pulse generator.

7. Sealing device according to claim 1, characterized in that the permanent magnet (14) is fixed to the first piece (8) by means of an overmoulding of a layer (16) of plastic which coats the permanent magnet.

8. Sealing device according to claim 1, characterized in that the permanent magnet (14) and the sensor (11) are orientated axially facing one another, and that the flexible sealing part (15) presses on a cylindrical axial part (8a) of the first piece (8).

9. Sealing device according to one of claim 1, characterized in that the permanent magnet (14) and the sensor (11) are orientated radially facing one another and that the flexible sealing part (15) presses on the annular radial part (8f) of the first piece (8).

10. Sealing device according to claim 1 wherein said flexible sealing part includes two annular sealing lips which are axially offset from one another and inclined with respect to a radial plane, and one of said annular sealing lips including at least one perforation for balancing pressure.

11. A bearing comprising:

a rotating race, a non-rotating race coaxial with the rotating race and rolling elements arranged between the rotating and non-rotating races;

a sealing device which includes, a first piece of annular overall shape secured to the non-rotating race of the bearing and supporting a permanent magnet;

a second piece of annular overall shape secured to the rotating race of the bearing and including an annular part forming a pulse generator and a flexible sealing part in frictional contact with the first piece, the first and second pieces of the sealing device being mounted in a radial space provided between the rotating and non-rotating races to provide a sealing of the bearing with respect to external surroundings, the permanent magnet being arranged facing a sensor which is fixed with respect to the non-rotating race, the pulse generator passing between the permanent magnet and the sensor during a rotation of the bearing to generate variations in magnetic flux detected by the sensor.

12. A bearing according to claim 11, characterized in that the first and second pieces (8, 9) each include a flange made of ferromagnetic material, which flange is fitted axially into the bearing, and in that the pulse generator (9b, 9e) of the second piece includes a plurality of openings (9c, 9f) or notches distributed circumferentially in a uniform fashion.

13. A bearing according to claim 12, characterized in that the flexible sealing part (15) includes an overmoulding component obtained by overmoulding an elastomer on the pulse generator, the openings of the pulse generator being blocked off by the overmoulding elastomer.

14. A bearing device according to claim 12, characterized in that the first piece (8) comprises a cylindrical axial part (8a) which serves both as a bearing surface for mounting on the non-rotating race (4, 30) of the bearing and as a sealing bearing surface for the flexible sealing part (15), a magnet support (8b) in the form of a tab or of a collar, and a sensor support (8c, 8f) also acting as a fastening zone for an overmoulding of a plastic connection head (10) housing the sensor (11).

15. A bearing device according to claim 12, characterized in that the first piece (8) has a part (8d, 8a) located behind the sensor (11) opposite the permanent magnet (14) to form a flux concentrator and to contribute to enclosing the magnetic field lines on the sensor when the sensor is facing an opening (9c, 9f) of the pulse generator.

16. A bearing device according to claim 12, characterized in that the permanent magnet (14) is fixed to the first piece (8) by means of an overmoulding of a layer (16) of plastic which coats the permanent magnet.

17. A bearing device according to claim 12, characterized in that the permanent magnet (14) and the sensor (11) are orientated axially facing one another, and that the flexible sealing part (15) presses on a cylindrical axial part (8a) of the first piece (8).

18. A bearing according to claim 12 characterized in that the permanent magnet (14) and the sensor (11) are orientated radially facing one another and that the flexible sealing part (15) presses on the annular radial part (8f) of the first piece (8).

19. A bearing device according to claim 11, characterized in that the flexible sealing part (15) comprises at least one annular sealing lip coming into frictional contact with a support surface of the first piece (8).

20. A bearing device according to claim 11 wherein said flexible sealing part includes two annular sealing lips which are axially offset from one another and inclined with respect to a radial plane, and one of said annular sealing lips including at least one perforation for balancing pressure.

* * * * *

UNITED STATES PATENT AND TRADEMARK OFFICE
CERTIFICATE OF CORRECTION

PATENT NO. : 5,382,098

DATED : Jan. 17, 1995

INVENTOR(S) : Christian Rigaux, et al

It is certified that error appears in the above-identified patent and that said Letters Patent is hereby corrected as shown below:

The title page, showing an illustrative figure, should be deleted and substitute therefor the attached title page.

In the drawings delete Figs. 1, 4, 5, 6, 7, 8 & 9 and substitute therefor the drawing sheets, consisting of Figs. 1, 4, 5, 6, 7, 8 and 9, as shown on the attached pages.

Signed and Sealed this

Twenty-eighth Day of November 1995

*Attest:*

BRUCE LEHMAN

*Attesting Officer*  *Commissioner of Patents and Trademarks*

United States Patent [19]

Rigaux et al.

[11] Patent Number: 5,382,098
[45] Date of Patent: Jan. 17, 1995

[54] SEALING DEVICE INCLUDING AN ENCODING ELEMENT FOR A BEARING, AND BEARING EQUIPPED WITH SUCH A DEVICE

[75] Inventors: Christian Rigaux, Artannes-sur-Indre; Pascal Lhote, Saint-Cyr-sur-Loire; Claude Caillault, Saint-Roch; Christophe Houdayer, Tours, all of France

[73] Assignee: SKF France, Clamart, France

[21] Appl. No.: 154,075

[22] Filed: Nov. 18, 1993

[30] Foreign Application Priority Data

Nov. 24, 1992 [FR] France ............... 92 14074

[51] Int. Cl.⁶ .................. F16C 33/76; G01P 3/48
[52] U.S. Cl. .................. 384/448; 324/207.25
[58] Field of Search .............. 384/448, 446; 324/207.25, 207.22, 207.21, 174, 173

[56] References Cited

U.S. PATENT DOCUMENTS

| | | | |
|---|---|---|---|
| 4,259,637 | 3/1981 | Bloomfield et al. | 324/207.25 X |
| 4,732,494 | 3/1988 | Guers et al. | 384/448 |
| 4,850,722 | 7/1989 | Bayer | 384/448 |
| 4,946,296 | 8/1990 | Olschewski et al. | 384/448 |
| 4,948,277 | 8/1990 | Alff | 384/448 |
| 5,004,358 | 4/1991 | Varvello et al. | 384/448 |
| 5,011,303 | 4/1991 | Caron | 384/448 |
| 5,195,830 | 3/1993 | Caillault et al. | 384/448 |
| 5,296,805 | 3/1994 | Clark et al. | 384/448 X |

FOREIGN PATENT DOCUMENTS

| | | |
|---|---|---|
| 320322 | 6/1989 | European Pat. Off. |
| 0397309 | 11/1990 | European Pat. Off. |
| 0438624 | 7/1991 | European Pat. Off. |
| 2558223 | 7/1985 | France |
| 2629155 | 9/1989 | France |
| 9010131 | 10/1990 | Germany |

*Primary Examiner*—Thomas R. Hannon
*Attorney, Agent, or Firm*—Beveridge, DeGrandi, Weilacher & Young

[57] ABSTRACT

The sealing device (1) for a bearing (2) includes a first piece (8) of annular overall shape secured to the non-rotating race (4) of the bearing and supporting a permanent magnet (14), a second piece (9) of annular overall shape secured to the rotating race (3) of the bearing and including an annular part forming a pulse generator and a flexible sealing part in contact with the first piece. In operation the first and second pieces (8, 9) mounted in the radial space between the rotating race and non-rotating race at one end of the bearing provide the sealing of the bearing with respect to the external surroundings, the permanent magnet (14) being arranged facing a sensor (11) which is fixed with respect to the non-rotating race, the pulse generator passing between the permanent magnet and the sensor during the rotation of the rotating race of the bearing.

20 Claims, 9 Drawing Sheets

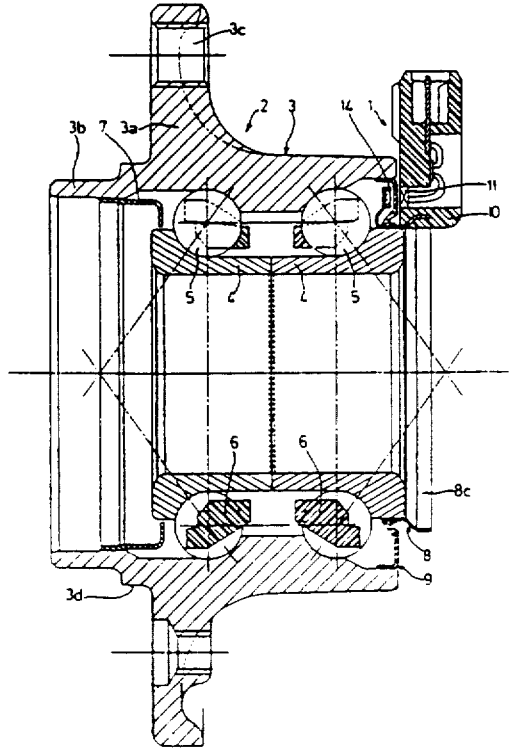

UNITED STATES PATENT AND TRADEMARK OFFICE
CERTIFICATE OF CORRECTION

PATENT NO. : 5,382,098
DATED : January 17, 1995
INVENTOR(S) : Christian Rigaux

Page 3 of 9

It is certified that error appears in the above-identified patent and that said Letters Patent is hereby corrected as shown below:

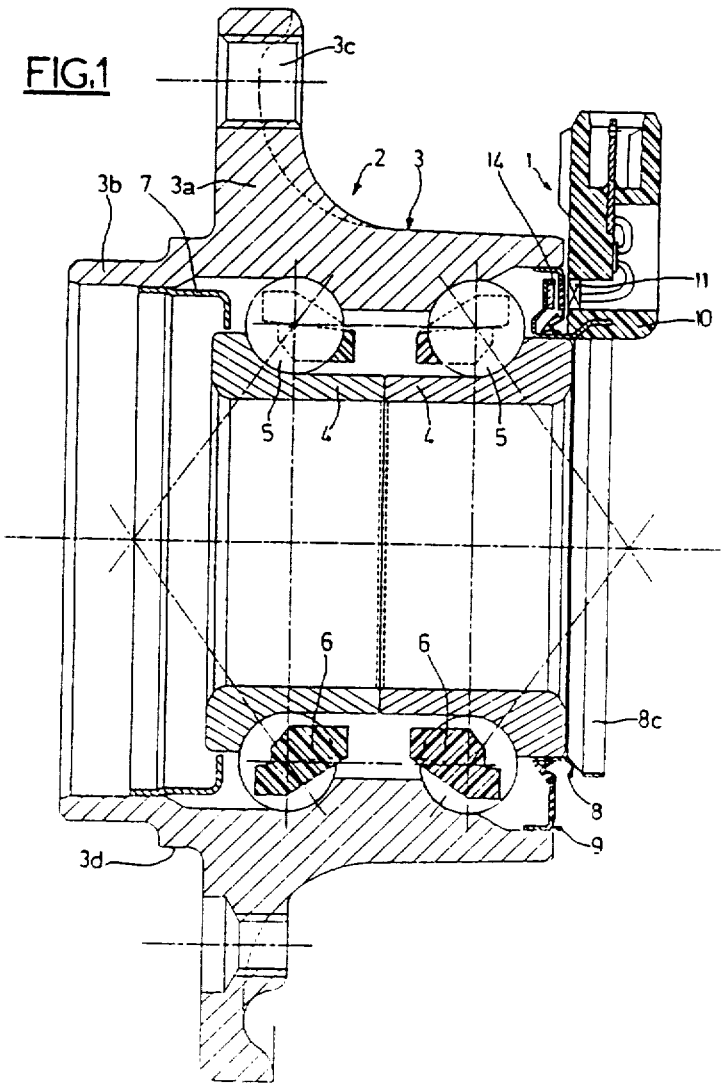

UNITED STATES PATENT AND TRADEMARK OFFICE
CERTIFICATE OF CORRECTION

PATENT NO. : 5,382,098

DATED : January 17, 1995

INVENTOR(S) : Christian Rigaux

It is certified that error appears in the above-identified patent and that said Letters Patent is hereby corrected as shown below:

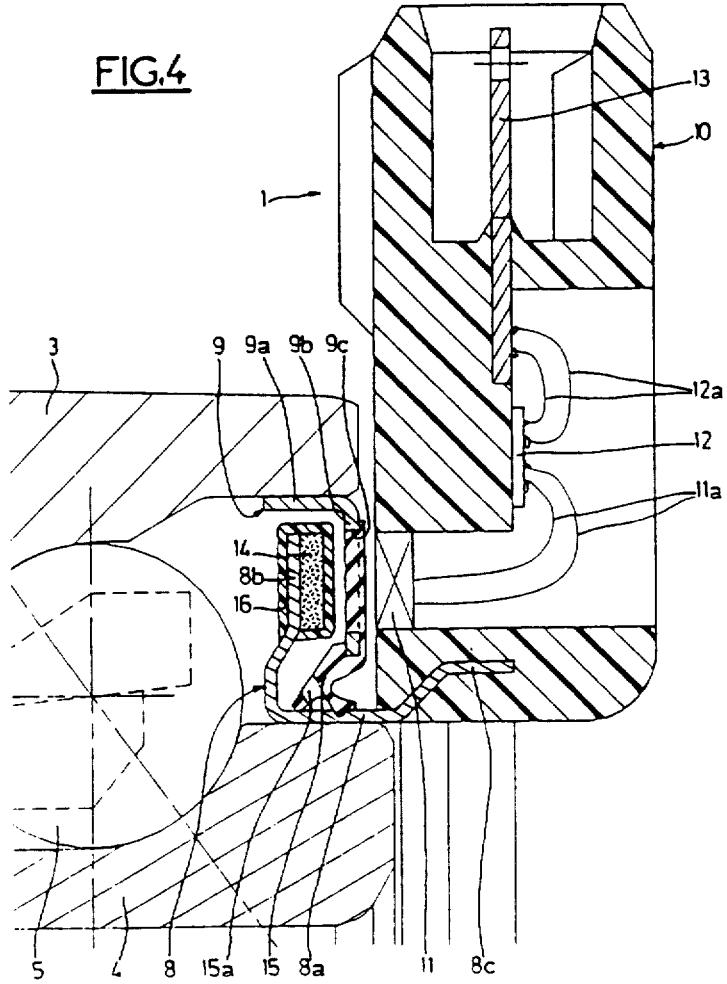

UNITED STATES PATENT AND TRADEMARK OFFICE
CERTIFICATE OF CORRECTION

PATENT NO. : 5,382,098

DATED : January 17, 1995

INVENTOR(S) : Christian Rigaux

It is certified that error appears in the above-identified patent and that said Letters Patent is hereby corrected as shown below:

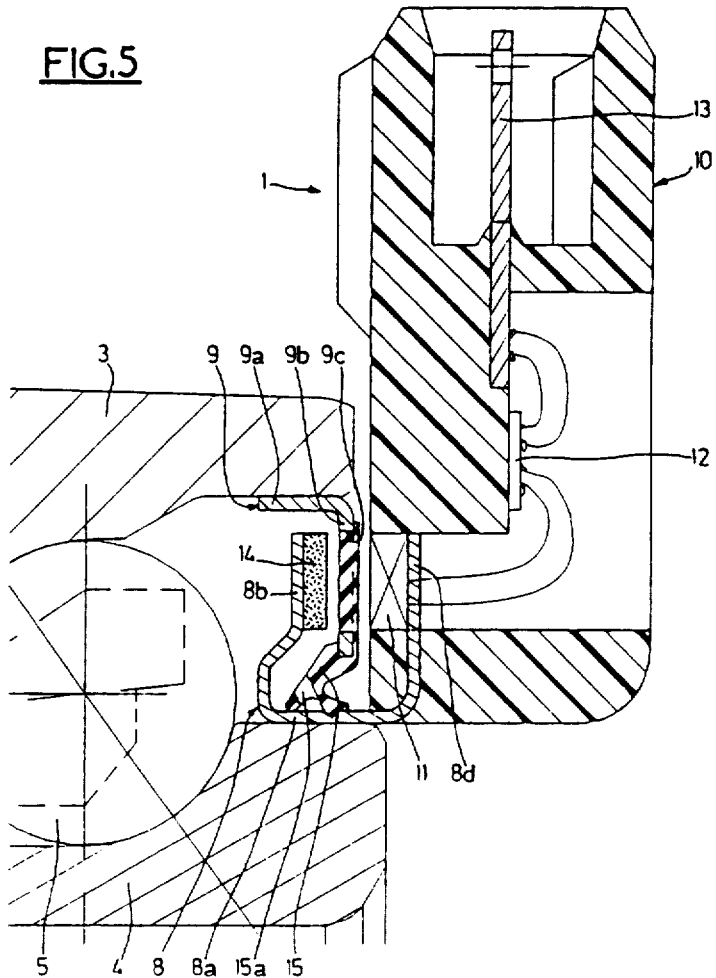

FIG.5

UNITED STATES PATENT AND TRADEMARK OFFICE
CERTIFICATE OF CORRECTION

PATENT NO. : 5,382,098

DATED : January 17, 1995

INVENTOR(S) : Christian Rigaux

It is certified that error appears in the above-identified patent and that said Letters Patent is hereby corrected as shown below:

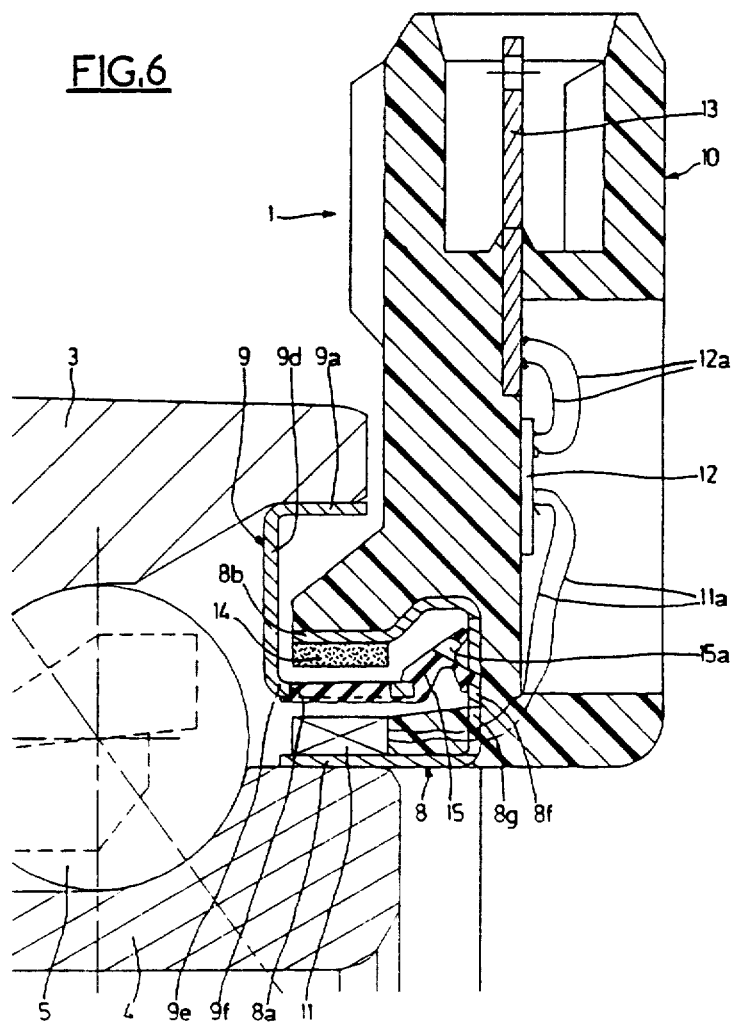

UNITED STATES PATENT AND TRADEMARK OFFICE
CERTIFICATE OF CORRECTION

PATENT NO. : 5,382,098
DATED : January 17, 1995
INVENTOR(S) : Christian Rigaux

It is certified that error appears in the above-identified patent and that said Letters Patent is hereby corrected as shown below:

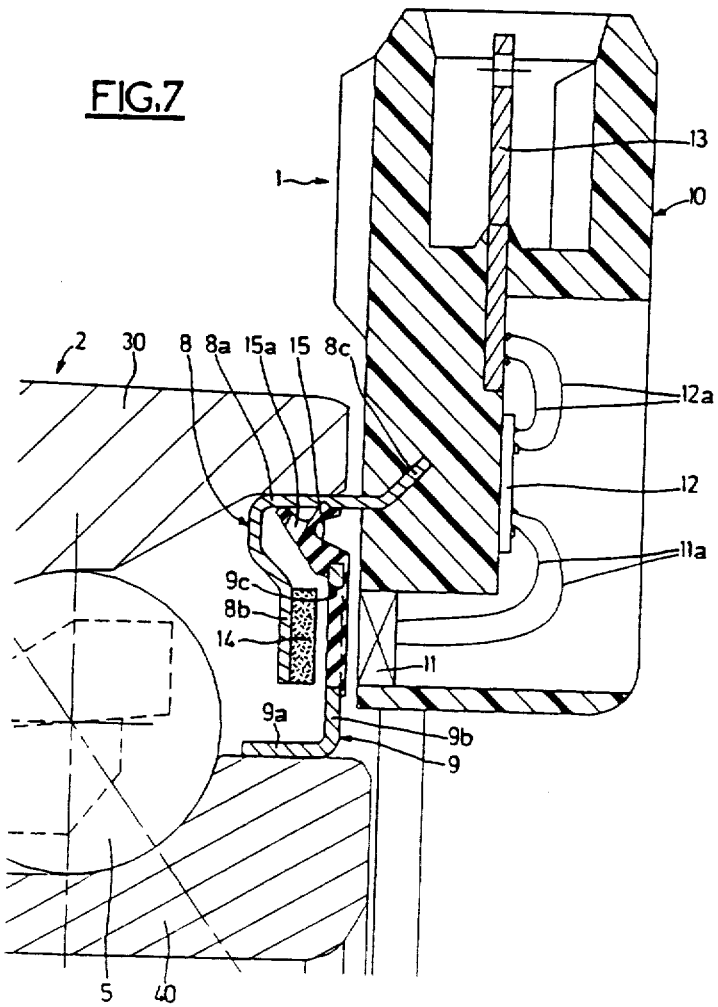

UNITED STATES PATENT AND TRADEMARK OFFICE
CERTIFICATE OF CORRECTION

PATENT NO. : 5,382,098

DATED : January 17, 1995

INVENTOR(S) : Christian Rigaux

It is certified that error appears in the above-identified patent and that said Letters Patent is hereby corrected as shown below:

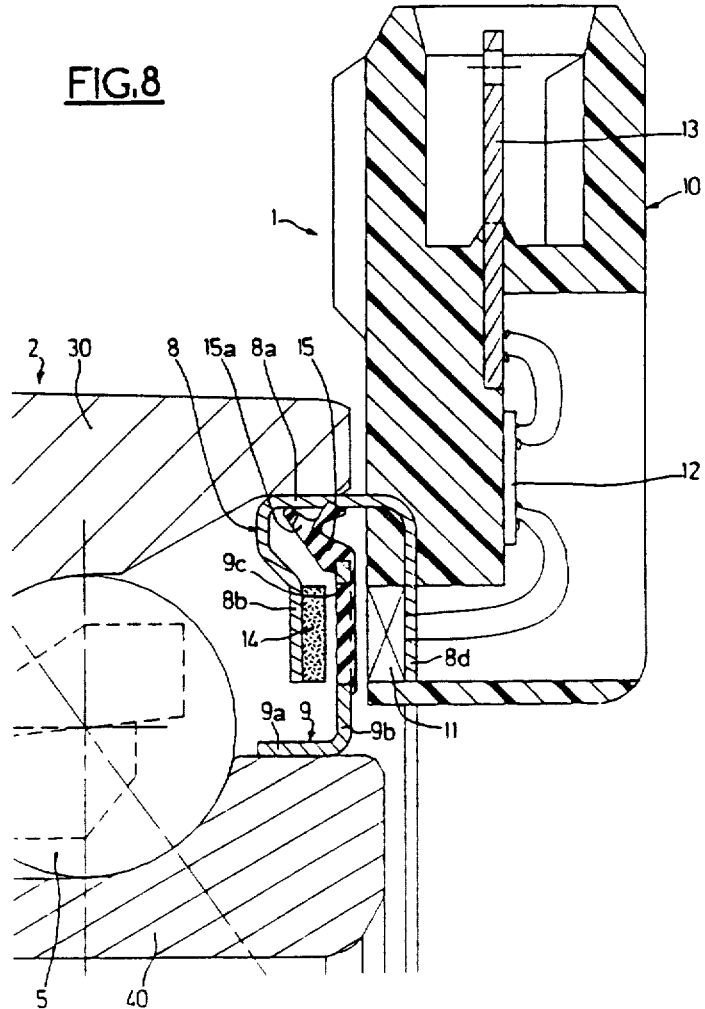

UNITED STATES PATENT AND TRADEMARK OFFICE
CERTIFICATE OF CORRECTION

PATENT NO. : 5,382,098
DATED : January 17, 1995
INVENTOR(S) : Christian Rigaux

It is certified that error appears in the above-identified patent and that said Letters Patent is hereby corrected as shown below:

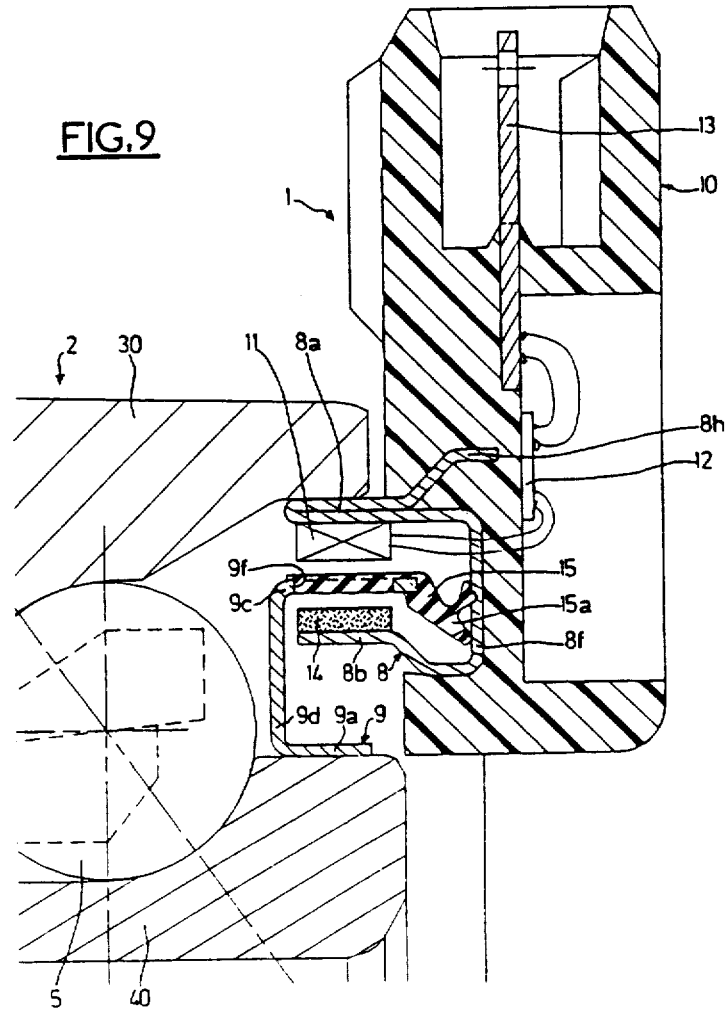

FIG.9